Jan. 14, 1930.                C. J. RAMSBURG                1,743,479
                          GAS PURIFICATION PROCESS
                         Original Filed Jan. 24, 1923
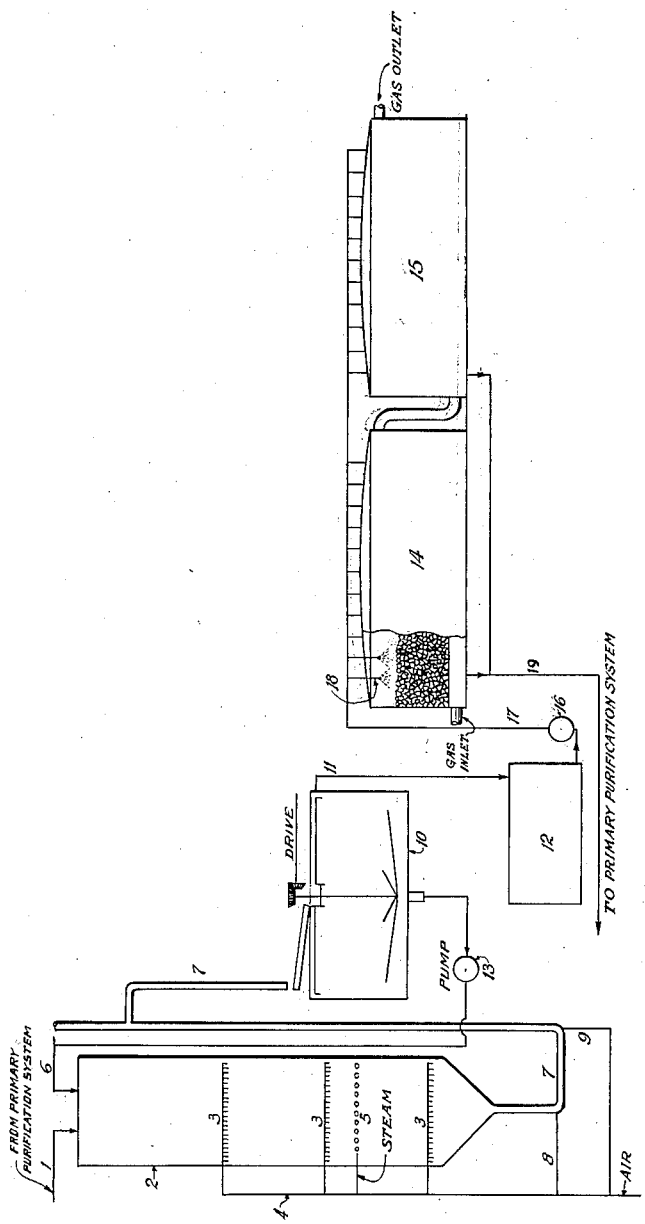
Inventor
Charles J. Ramsburg
By Munday, Clarke & Carpenter Attys.

Patented Jan. 14, 1930

1,743,479

UNITED STATES PATENT OFFICE

CHARLES J. RAMSBURG, OF PITTSBURGH, PENNSYLVANIA, ASSIGNOR TO THE KOPPERS COMPANY, OF PITTSBURGH, PENNSYLVANIA, A CORPORATION OF PENNSYLVANIA

GAS-PURIFICATION PROCESS

Application filed January 24, 1923, Serial No. 614,582. Renewed December 6, 1927.

This invention relates to the removal of hydrogen sulphide and other noxious constituents, such as hydrocyanic acid, from gases containing them. An object of the invention is to provide an improved process for treating such gases, whereby not only the bulk of the hydrogen sulphide is removed but even the last traces of it, with the result that it will be found unnecessary to subject the purified gas to any treatment in the usual iron oxide boxes.

The invention is of particular utility in connection with a gas purification process operating generally in accordance with that process described and claimed in the prior Letters Patent of the United States of David L. Jacobson, for Process for purifying gases, No. 1,390,037, granted September 6, 1921. Such Jacobson gas purification liquid process includes bringing the gas to be purified into direct contact with an alkaline absorbent agent, such as a solution of sodium carbonate, to absorb the noxious constituents from the gas, and then subjecting the absorbent agent containing the absorbed impurities to aeration to remove the absorbed impurities and to regenerate the absorbent agent so as to render it available for further gas purification. The present invention, however, is not confined to the process just referred to, but is broadly applicable to a variety of processes based on the employment of liquid media for gas purification.

A process such as that of the above mentioned prior patent may be practiced in two essential parts of apparatus, i. e., the chamber in which the gas is brought into contact with the purifying liquid, and the chamber in which the liquid containing the absorbed impurities is regenerated. In practice the first chamber is designated as the "absorber" and the second the "actifier". These two terms will be employed in the following description.

The removal of the last traces of the hydrogen sulphide from the gas is a requirement that most gas companies must meet, being imposed by law in most places. By this invention, there is provided a process and apparatus whereby the last traces of hydrogen sulphide are removed from the gas by a system of liquid purification, complete in itself, without any resort whatever to ordinary iron oxide purification of the gas discharged from the liquid purification plant. Hydrocyanic acid is also completely removed, with resulting improvement in the quality of the gas.

In addition to the general objects recited above, the invention has for further objects such other improvements or advantages in operation and results as are found to obtain in the process and apparatus hereinafter described or claimed.

In the accompanying drawings forming a part of this specification and showing, for purposes of exemplification, a preferred form and manner in which the invention may be embodied and practiced, but without limiting the claimed invention specifically to said illustrative instances: Figure 1 is an elevational view, partially diagrammatic, of one form of apparatus for carrying out the improved process of the invention.

In its present embodiment, the invention is applied to the purification of coke oven gas, and, for convenience, the present description will be confined to this use of the invention. Features of the invention are, however, applicable to other useful applications, for example, to other gases. Consequently, the invention is not confined in scope to the specific use and embodiment herein described as an illustrative example.

The "primary system" hereinafter referred to is whatever liquid purification system may be employed for removing the bulk of the above-mentioned impurities from the gas, the present invention then being employed to remove the remaining traces of such impurities and constituting the secondary system; and the particularly primary system hereinafter referred to as an illustrative example, but without limitation thereto, is that of the above-mentioned Jacobson Patent No. 1,390,037 and especially the form of it described as a primary (absorber and actifier) system in the exemplifying specifications of the co-pending Bird application Serial No. 603,062, filed November 24, 1922.

In the preferred primary system for effecting the absorption of the sulphur compounds and other impurities from the gas, there is employed a water solution of an alkaline compound having an affinity for hydrogen sulphide. A number of the compounds of the alkali metals and alkaline earths possess this property. A solution of sodium carbonate in water is especially suitable for effecting the absorption of sulphur from the gas, because of the great affinity which a water solution of sodium carbonate has for hydrogen sulphide and because of the cheapness and availability of this sodium salt. A solution of sodium carbonate is strongly basic in its properties. When sodium carbonate dissolved in water is brought into contact with gas, such as coke oven gas, containing carbon dioxide and hydrogen sulphide, carbon dioxide is absorbed, and sodium bicarbonate is formed, as may for example, be illustrated by the following explanation:

$$Na_2CO_3 + CO_2 + H_2O = 2NaHCO_3$$

The solution of sodium carbonate will also effect the absorption from the gas of such sulphur compounds as hydrogen sulphide, $H_2S$. The absorption of hydrogen sulphide may be illustrated by the following equation:

$$Na_2CO_3 + H_2S = NaHCO_3 + NaHS$$

In applying the above to the absorption of sulphur from a gas, it is preferable to use a dilute solution of sodium carbonate in water. A concentration from about two to about five percentum of sodium carbonate will usually be found satisfactory.

In such preferred primary system the regeneration of the solution containing the absorbed impurities in the primary actifier may be illustrated by the following equations:

$$2NaHCO_3 = Na_2CO_3 + CO_2 + H_2O$$
$$2NaHS + CO_2 + H_2O = Na_2CO_3 + 2H_2S$$

and also:

$$NaHCO_3 + NaHS = Na_2CO_3 + H_2S$$

The rapid and thorough aeration greatly promotes the foregoing reactions by rapidly removing the gaseous products, as well as checking the formation of thiosulphates, and the solution gives up its hydrogen sulphide and is rejuvenated. Instead of air, another similarly inert gas may be used in the primary actifier.

In such primary system, the gas to be purified is first passed through the primary absorber, and there is brought into contact with a solution of sodium carbonate pumped from a primary sump through pipes and sprays. The impure gas enters the bottom of the primary absorber and the gas from which the bulk of the impurities have been removed discharges from the top of the primary absorber. The solution containing the absorbed impurities from the bottom of the primary absorber runs through pipes and is discharged by sprays into the top of the primary actifier. There the absorbed impurities are removed by means of air blown into the bottom of the actifier. The air escapes through a stack passing from the top of the primary actifier up through the middle of the primary absorber. The solution thus regenerated runs into the primary sump and is used over and over again. The major portion of the impurities are removed from the gas in the primary absorber, and the remaining lesser portion are removed by the secondary system of the present invention, employing a correspondingly smaller bulk of liquid which has undergone a special treatment, as hereinafter illustratively described.

The present invention is a development of the complete purification process of the aforesaid Bird application but differs from Bird's specific embodiment of his generic invention. In the present invention, a portion of the actified solution may be withdrawn from the primary system to supply the secondary system; but, in the secondary system, instead of employing air, consuming considerable power for pumping, to remove the last traces of hydrogen sulphide, I use some substance capable of reacting chemically with the hydrogen sulphide to form an inert sulphur compound, and the solution thus treated has a zero partial pressure with respect to hydrogen sulphide and is consequently capable of removing the last traces of hydrogen sulphide from the gas which has already passed through the primary purification stage.

I may use a considerable variety of substances to react with the small amount of hydrogen sulphide in the solution from the primary system. Examples are compounds of iron, manganese, lead, zinc and other metals capable of forming insoluble sulphides in alkaline solutions. Specific examples are iron sulphates, iron oxides, manganese sulphates, manganese oxides, etc. and I prefer particularly to use compounds of the iron group since it is possible to readily effect revivification of these compounds so that the same reacting substance may be used over and over again. The oxides, hyroxides, carbonates and other compounds of iron may be used in this way and ordinary soft hematite iron ore is especially suitable since it is cheap and readily available. In the following description, especial reference will be made to the use of this material.

Certain conditions stated in said Bird's case are also true in the present case: "It has been found to be most convenient and economical to operate in such a way that approximately 90% of the hydrogen sulphide and hydrocyanic acid are removed from the gas in the primary system. Absolute purification is difficult of accomplishment in a single stage system of this sort without very greatly decreasing its capacity. When a single stage liquid purification system is employed, a little hydrogen sulphide remains in the form of alkaline hydrosulphide in the solution going from the actifier to the primary sump. In order to use this solution to remove the last traces of hydrogen sulphide from the gas, in the second stage of the process, the last traces of hydrosulphides must be removed from the solution. On the other hand, since only traces of hydrogen sulphide remain in the gas passing out of the primary absorber, only a small volume of solution will be required to furnish the alkali necessary to remove all of the hydrogen sulphide. The essential condition is that the solution thus employed for the removal of these traces from the gas be free from sulphide compounds such as exert a partial pressure with respect to hydrogen sulphide, and, as a further important condition, that the solution, in the second stage, be distributed over a very large surface to insure thorough contact with the gas. Analogous considerations apply to hydrocyanic acid and cyanide compounds."

Advantage is taken of the fact that the actual quantity of hydrogen sulphide in the gas leaving the primary system is very small so that a relatively small amount of reacting solution is required for its removal. This small amount of solution as it comes from the primary system also contains very small amounts of sulphide compounds, so that only a small amount of reacting substance is used to render these inert. In ordinary practice, the solution leaving the primary actifier contains about 17 grains of sulphide compounds, calculated as $H_2S$, per gallon. Twenty-two pounds of ordinary iron ore are sufficient for the complete removal of the sulphide compounds from 1000 gallons of such solution and 1000 gallons are ample for the removal of the last traces of hydrogen sulphide from 60,000 to 70,000 cu. ft. of gas which has passed through the primary purification stage. If ferrous sulphate be employed, 24 pounds of ordinary crystallized ferrous sulphate are sufficient for the treatment of 1000 gallons of the solution from the primary actifier. The ferrous sulphate reacts as follows:

$$FeSO_4 + NaHS = FeS + NaHSO_4$$

The $NaHSO_4$ reacts with sodium carbonate as follows:

$$NaHSO_4 + Na_2CO_3 = NaHCO_3 + Na_2SO_4$$

Thus, the use of iron sulphate results in a certain loss of soda through the formation of sodium sulphate, but the actual loss is comparatively small on account of the small quantity of the substances entering into the reaction.

In my preferred system, I use iron oxide in the form of soft hematite ore, warm the solution to 50° C. in contact with the iron ore and agitate with air. The following essential reactions occur as noted in my Ramsburg U. S. Patent No. 1,436,196:

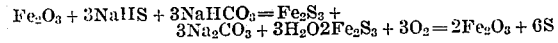
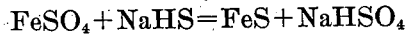
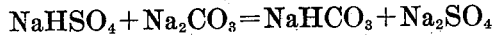

Rapid formation of sodium thiosulphate also occurs so that a considerable proportion of the sulphide compounds are rendered inert in this way, but the loss of soda is insignificant on account of the small quantities involved. The heating of the solution to 50° C. is important because at lower temperatures the reactions do not occur so readily and the settling of the suspended solids is slower.

Agitation with air is to be preferred but is not essential. Mechanical agitation may be employed with or without air agitation. If mechanical agitation alone is employed, iron sulphide only is formed. This may be allowed to settle and may be removed and revivified separately if desired.

One system of apparatus that may be used for carrying out the process is shown in Figure 1. The primary liquid purification system is operated as usual, removing approximately 90% of the hydrogen sulphide from the gas. A portion of the actified solution from the primary system is run continuously through pipe 1 into agitator 2. This is a tall cylindrical vessel equipped with perforated air pipes 3 at one or more different levels to which compressed air is admitted through the manifold 4. The agitator also has steam coils 5 for keeping the solution at a temperature of approximately 50° C. Iron oxide sludge is run into the agitator through the line 6. Mechanical agitation may be employed in conjunction with the compressed air if desired. The capacity of the agitator should be such that the solution will be subjected to agitation for approximately one hour. It is desirable to admit the iron oxide sludge at such a rate that the $Fe_2O_3$ added will be approximately twice the reacting equivalent of the hydrogen sulphide entering with the actified solution through the pipe 1. The contents of the agitator are continuously discharged through pipe 7, to which a little compressed air may be supplied through pipes 8 and 9 to prevent settling. These materials are discharged into a Dorr thickener 10 or other apparatus adapted to separate the liquid from the sludge. The clear solution is continuously drawn off through pipe 11 into tank 12. The iron oxide sludge is pumped from the Dorr thickener by pump 13 through pipe 6 back into the agitator. The solution may be cooled as it flows from pipe 11 or cooling coils may be used in tank 12; but in most cases, this special cooling will be found unnecessary. The clean solution in tank 12 is used to remove the last traces of hydrogen sulphide from the gas by pumping it over beds of non-reacting solid material, for example, coke, contained in final purification boxes. There are preferably two such boxes in series (14 and 15). The pump 16 conveys the solution through line 17 to sprays 18. The used solution drains from the bottom of the boxes through line 19 and flows back to the primary system. The pump operation is preferably conducted intermittently and may be controlled by an automatic arrangement as described in the aforesaid Bird application.

The above described process not only removes the last traces of hydrogen sulphide, but is also effective in removing the last traces of hydrocyanic acid from gas.

Small amounts of sulphur gradually accumulate in the system. A considerable proportion of this floats to the top of the solution and may be skimmed off. It is only necessary to renew the oxide at very long intervals to avoid excessive accumulation of sulphur. The oxide thus removed may be treated for the extraction of sulphur and then may be returned to the system. However, the amounts of sulphur thus recoverable are so small that in most cases it is preferable to discard this material and use entirely fresh oxide which, as above stated, may be in the form of soft hematite iron ore.

Instead of continually withdrawing a portion of the actified solution from the primary system, treating this with iron oxide, using the treated solution for removing the last traces of hydrogen sulphide from the gas and returning the used solution to the primary system, the process for the removal of the last traces may be made complete in itself by returning the used solution, from 19, to the agitator 2, and sufficient soda to replace losses may be added to any point in such system, preferably to tank 12.

My invention as hereinbefore set forth may be variously embodied within the scope of the claims hereinafter made.

I claim:

1. In a process of purifying gas, the combination of steps that consists in: passing the gas in intimate contact with an absorbent solution reactive to the impurities in the gas; commingling the fouled solution with a compound of a metal whose sulphide is insoluble reacting chemically with the fouling constituents to form inert residues that may be removed as they accumulate; effecting separation of the revivified absorbent solution and returning it into contact with further gas that is to be purified and recirculating the separated reactive compound to commingle with further fouled solution that is to be revivified; and, to compensate any losses or withdrawals, maintaining a supply of the absorbent solution and of the reactive compound for revivifying it.

2. In a process of purifying gas, the combination of steps that consists in: passing the gas in intimate contact with a sodium carbonate solution to absorb the last traces of hydrogen sulphide; commingling the fouled solution with iron oxide; removing accumulations of sulphur or inert sulphur compounds from the mixture; effecting separation of the revivified sodium carbonate solution and returning it into contact with further gas that is to be purified and recirculating the separated iron oxide sludge into contact with further fouled solution that is to be revivified; and, to compensate any losses or withdrawals, maintaining a supply of the sodium carbonate solution and iron oxide.

3. The process of purifying gases which consists in: passing the gas into contact with a relatively large volume of alkaline absorbent agent to absorb the bulk of the hydrogen sulphide impurities from the gas, then passing the thus purified gas into contact with a relatively smaller volume of alkaline absorbent agent to absorb the residue of hydrogen sulphide from the gas; subjecting the absorbent agent discharged from the first absorption stage of aeration to remove the absorbed impurities, commingling the absorbent agent discharged from the second absorption stage with the aerated solution from the first absorption stage; withdrawing part of the solution from the thus commingled bulk and subjecting such withdrawn part to treatment with a compound of a metal whose sulphide is insoluble reactive to the sulphur constituents in said solution; recirculating the solution from the last mentioned aeration stage back to the second absorption stage; and continuously recirculating the remainder of the solution from the first mentioned aeration stage back to the primary absorption stage; substantially as specified.

4. The process of purifying gases which consists in: passing the gas into contact with a relatively large volume of sodium carbonate absorbent agent to absorb the bulk of the hydrogen sulphide impurities from the gas, then passing the thus purified gas into contact with a relatively smaller volume of sodium carbonate absorbent agent to absorb the residue of hydrogen sulphide from the gas; subjecting the absorbent agent discharged from the first absorption stage to aeration to remove the absorbed impurities, commingling the absorbent agent discharged from the second absorption stage with the aerated solution from the first absorption stage; withdrawing part of the solution from the thus commingled bulk and subjecting such withdrawn part to treatment with a compound of a metal whose sulphide is insoluble reactive to the sulphur constituents in said solution; recirculating the solution from the last mentioned aeration stage back to the second absorption stage; and continuously recirculating the remainder of the solution from the first mentioned aeration stage back to the primary absorption stage; substantially as specified.

5. In a process of purifying gas, the combination of steps that consists in: passing the gas in intimate contact with an alkaline absorbent solution; commingling the fouled solution with a compound of a metal whose sulphide is insoluble reacting chemically with the fouling constituents to form inert residues that may be removed as they accumulate; effecting separation of the revivified absorbent solution and returning it into contact with further gas that is to be purified and recirculating the separated reactive compound into commingling with further fouled solution that is to be revivified; and, to compensate any losses or withdrawals, maintaining a supply of the absorbent solution and of the reactive compound for revivifying it.

6. In a process of purifying gas, the combination of steps that consists in: passing the gas in intimate contact with an alkaline absorbent solution; commingling the fouled solution with a compound of a metal whose sulphide is insoluble reacting chemically with the fouling constituents to form inert residues that may be removed as they accumulate; effecting separation of the revivified absorbent solution and returning it into contact with further gas that is to be purified and recirculating the separated reactive compound into commingling with further fouled solution that is to be revivified.

7. In a process of purifying gas, the combination of steps that consists in: passing the gas in intimate contact with an absorbent solution reactive to the impurities in the gas; commingling the fouled solution with a compound of a metal whose sulphide is insoluble reacting chemically with the fouling constituents to form inert residues that may be removed as they accumulate; effecting separation of the revivified absorbent solution and returning it into contact with further gas that is to be purified and recirculating the separated reactive compound into commingling with further fouled solution that is to be revivified.

8. The process of purifying gases which consists in: passing the gas into contact with a relatively large volume of alkaline absorbent solution to absorb the bulk of the hydrogen sulphide impurities from the gas, then passing the thus purified gas into contact with a relatively smaller volume of alkaline absorbent solution to absorb the residue of hydrogen sulphide from the gas, the solution being revivified after such absorption of impurities by treatment with a compound of a metal whose sulphide is insoluble reactive to the impurities in the solution; substantially as specified.

9. The process of purifying gases which consists in: passing the gas into contact with a relatively large volume of sodium carbonate absorbent solution to absorb the bulk of the hydrogen sulphide impurities from the gas, then passing the thus purified gas into contact with a relatively smaller volume of sodium carbonate absorbent solution to absorb the residue of hydrogen sulphide from the gas, the solution being revivified after such absorption of impurities by treatment with a compound of a metal whose sulphide is insoluble reactive to the impurities in the solution; substantially as specified.

10. The process of purifying gases, which consists in: passing the gas through non-reacting solid material drenched with a solution reactive to the impurities in the gas, discharging the solution from the non-reacting material, regenerating said solution by treatment with a compound of a metal whose sulphide is insoluble reactive to the impurities in the solution, and drenching the non-reacting material with the regenerated solution; substantially as specified.

11. The process of purifying gases, which consists in: subjecting the gas to a primary absorption stage in which the gas is brought into contact with a solution reactive to the hydrogen sulphide impurities in the gas to remove the bulk of such impurities from the gas, and then passing the gas into contact with a second volume of absorbent solution to remove the residue of such impurities, the solution from the second absorbent stage being revivified by treatment with a compound of a metal whose sulphide is insoluble reactive to such impurities; substantially as specified.

12. In a two-stage gas purification process, treating the gas to be purified in the first stage with an alkaline absorbent solution to remove the bulk of the sulphur impurities, and, in the second stage, treating the gas to remove the residue of the impurities with a second bulk of solution that is regenerated by treatment with a compound of a metal whose sulphide is insoluble reactive to the impurities absorbed from the gas; substantially as specified.

13. In a two-stage gas purification process, treating the gas to be purified in the first stage with an alkaline absorbent solution to remove the bulk of the sulphur impurities, and, in the second stage, treating the gas to remove the residue of the impurities with a second bulk of solution that is regenerated by treatment with iron oxide.

14. In a two-stage gas purification process, treating the gas to be purified in the first stage with an alkaline absorbent solution to remove the bulk of the sulphur impurities, and, in the second stage, treating the gas to remove the residue of the impurities with a second bulk of solution that is regenerated by treatment with an iron compound reactive to the impurities absorbed from the gas.

15. In a process of purifying gas, the combination of steps that consists in: passing the gas in intimate contact with an alkaline solution to absorb the last traces of hydrogen sulphide; commingling the fouled solution with iron oxide; removing accumulations of sulphur or inert sulphur compounds from the mixture; effecting separation of the revivified alkaline solution and returning it into contact with further gas that is to be purified and recirculating the separated iron oxide sludge into contact with further fouled solution that is to be revivified.

16. In a process for purifying gases the improvement consisting in: taking a solution containing alkali-metal sulphide from the gas purification stage, treating said solution with an iron compound, aerating the resulting suspension, separating the solid products and using the resulting solution in a gas purification stage.

17. In a process for purifying gases using a solution for absorbing impurities from the gas the improvement consisting in: treating the spent solution with an iron compound, aerating the resulting suspension, separating the resulting sludge and returning the solution to the gas purification stage.

18. A process as claimed in claim 17, in which the spent solution contains alkali-metal sulphide and in which the resulting sludge is iron oxide and free sulphur.

19. That process of decomposing soluble sulphides contained in a spent gas purification liquor which consists in: heating said liquor with an iron compound present and aerating the resulting suspension whereby the sulphide is decomposed and free sulphur formed.

20. A process as claimed in claim 19, in which the heating and aeration is conducted simultaneously.

21. That process of decomposing soluble sulphides contained in a spent gas purification liquor which consists in: heating to a temperature in excess of 50° C. said liquor in the presence of an iron compound and aerating the resulting suspension whereby the sulphide is decomposed and free sulphur formed.

22. That process of decomposing soluble sulphides contained in a spent gas purification liquor which consists in: heating said liquor together with an iron compound and aerating the resulting suspension whereby the sulphide is decomposed and free sulphur formed and removing the sulphur and the iron compound.

23. That process of decomposing soluble sulphides contained in a spent gas purification liquor which consists in: heating said liquor in the presence of a compound of a metal whose sulphide is insoluble and aerating the resulting suspension whereby the sulphide is decomposed and free sulphur formed, and separating the clear liquor from the sulphur and the compound of a metal whose sulphide is insoluble.

24. Commingling foul liquid containing hydrogen sulphide impurities with a compound of a metal whose sulphide is insoluble reacting chemically with the hydrogen sulphide impurities to form inert residues that may be removed as they accumulate; aerating the mixture while commingled, to revivify the metal and liberate free sulphur; effecting separation of the thus treated liquid; recirculating the separated reactive compound to commingle with further foul liquid; and, to compensate losses or withdrawals, maintaining a supply of additional reactive compound.

In testimony whereof I have hereunto set my hand.

CHARLES J. RAMSBURG.